Sept. 5, 1967 E. A. RICHARDSON 3,339,633
POLYEPOXIDE CONSOLIDATION OF EARTHEN MATERIALS
Filed July 27, 1965

INVENTOR:
E. A. RICHARDSON
BY: *Joseph L. Arabolo*
HIS ATTORNEY 3,339,633
POLYEPOXIDE CONSOLIDATION OF EARTHERN MATERIALS
Edwin A. Richardson, Houston, Tex., assignor to Shell Oil Company, New York, N.Y., a corporation of Delaware
Filed July 27, 1965, Ser. No. 475,094
18 Claims. (Cl. 166—33)

The present invention is directed to a method for consolidating and solidifying loose earthen materials into a permeable mass, and more particularly to an improved method for consolidating loose argillaceous materials surrounding boreholes which penetrate oil-producing reservoirs with epoxy-amino resins.

When recovering oil from subterranean reservoirs, operators often encounter incompetent formations of loose earthen materials, such as sand, clay, etc., that tend to enter the borehole entrained in the effluent produced from the reservoir. The smaller particles entrained in the reservoir effluent tend to remain suspended in the effluent and have a serious abrading action on both downhole and uphole equipment. Further, the coarser particles tend to settle in the bottom of the borehole proper, screen-out some of the smaller particles and eventually clog or plug the borehole to such an extent that it may be necessary to abandon the well or recomplete it to eliminate the plug. The influx of solid materials in producing oil wells adds considerably to the recovery cost and the damage to production equipment is often substantial. Further, additional rig time to replace parts and complete loss of oil production are some of the more costly results from the influx of solid materials into producing oil wells.

Since there are many oil wells, particularly in the coastal areas of the United States, which penetrate incompetent (unconsolidated) reservoir formations, there has been considerable interest in methods to restrict intrusion of solid materials into producing wells. Various techniques have been employed to avoid the influx of solid particles into oil producing boreholes. While there has been some limited success, there is still a need for more effective and better consolidation techniques.

Screens, liners, gravel packs and other mechanical means of controlling of intrusion of the earthen materials into boreholes have been widely used by the oil-producing industry. However, these mechanical methods do not leave the casing clear for multiple completions and their service life is usually far less than the production life of the well, requiring their periodic replacement. Accordingly, there has been continuing demand for cheaper, more efficient methods of solving the solids intrusion problem without the above drawbacks.

In some boreholes, plastic consolidating agents have been used to avoid the drawbacks of mechanical means above but they have not been a universal panacea to the solids intrusion problem. Consolidations with plastics often result in long shut-in times and also frequently require that several stages of resin composition be injected as separate slugs to achieve a useful consolidation.

Since this invention relates to the consolidation of incompetent reservoirs with plastic consolidating agents (resins), these types of consolidation in the prior art will be discussed in detail. In general, plastic agents are employed directly in the reservoir in an attempt to bond (consolidate) the loose grains or particles together without losing appreciable permeability. Ostensibly, a consolidation with plastics looks quite simple; however, in reality, it is an extremely complex operation because of the environment into which the plastic agents are introduced. A few of the more complex problems are those involving downhole injection, locating the plastic in specific areas of the reservoir, controlling permeability and achieving necessary strength for a useful service life. Further, the presence of naturally occurring fluids may cause complications in reaction control.

Other difficulties with plastic consolidations are experienced because of the various mineral compositions encountered in the reservoir proper, such as silica, carbonate, shale, mica and clay. Clay, particularly bentonite clays, are highly hydroscopic and tend to swell when contacted by aqueous solutions, and in addition, clays tend to have vast surface areas which makes coating with resins difficult. Often, clays or clayey materials contain catalytic sites which may catalyze the polymerization rate of the plastics, gelling them prematurely. Activators, such as carbonates present in the reservoir, may also cause the plastic to polymerize too rapidly and gel before it is uniformly distributed in the formation which can result in substantial losses of permeability. Therefore, it is apparent that consolidations of incompetent formations with plastic materials is a complex problem needing skillful and sophisticated solutions.

Prior art consolidations with plastic materials are discussed in numerous patents. In U.S. Patent 2,476,015, issued to Wrightsman, a consolidation process for sand using two slugs of a homogeneous mixture of an aqueous solution of aldehydes and hydroxyaryl compounds with an acid catalyst which are injected sequentially, into a water wet formation is disclosed. Other patent art relating to sand consolidation with plastics are U.S. 2,378,-817, U.S. 3,123,138 and 3,176,769. Also, an article in the Oil and Gas Journal, Apr. 16, 1962, p. 112, discloses the use of phenolic resins (formalin-cresol resins) with co-catalysts of a carbonate and sodium hydroxide in a sand consolidation process to control the reaction rate of the plastic.

A more recent patent issued to Hilton, U.S. Re. 24,747, teaches the injection of a two-part mixture into a reservoir to be consolidated, the first part containing an epoxy which is supposed to coat (wet) the grains to be consolidated, followed by a second part or slug containing a curing or hardening agent to polymerize the epoxy adhering to the surfaces of the sand particles and to displace the excess epoxy from the pore space. See also, U.S. Patent Nos. 3,176,767 and 3,176,768 which are similar to Hilton.

In the processes, such as Hilton, injecting a polyepoxide devoid of amine (curing agent) has numerous inherent disadvantages due to the properties of the earth formations within which the solutions must become intermingled. The flow paths followed by a fluid and the position it occupies within an earth formation are strongly effected by the viscosity of the fluid and formations are generally non-homogeneous. In such processes, the first injected fluid which contains the epoxide is subject to localized changes in its viscosity due to formation component catalyzed polymerizations of the polyepoxide. Therefore, the processes such as Hilton tend to cause some zones to be penetrated by one of the fluids but not the other. This results in poorly consolidated reservoirs.

The prior art discusses many of the difficulties experienced in consolidations with plastics in oil producing reservoirs and when the reservoir contains sand or clays having a silt content above ten percent, the reservoir will be poorly consolidated, if at all, using the known processes.

Accordingly, it is an object of this invention to provide a method of consolidating loose earthen materials occurring in oil-producing reservoirs which have high silt contents with epoxy-amino resins without loss of appreciable permeability.

Another important object of this invention is the provision of a method for shortening the curing interval required for consolidations with compositions of polyepoxides and polyamines.

Other objects will be apparent from the description of the invention and these stated objects are not all inclusive or exclusive.

The essential steps of this improved method of obtaining consolidation of loose earthern materials with epoxy-amino resins includes:

(a) Injecting into a permeable mass to be consolidated, a solution containing a mixture of polyepoxides having a plurality of vicinal epoxy groups and polyamines having a plurality of nitrogen atoms having at least one hydrogen atom attached to each nitrogen atom which are dissolved in a solvent vehicle; and (b) Overflushing the permeable mass containing the solution with a predominantly aliphatic liquid hydrocarbon which is miscible with the solvent vehicle and immiscible with the polyepoxides, polyamines and their polymer products.

Using this novel technique, it is possible to consolidate shaley formations which cannot be satisfactorily consolidated with known processes because of the presence of silt materials whose high surface areas make consolidations difficult, for reasons more fully explained hereinafter. To illustrate the effectiveness of the novel method of this invention over the known processes, reference is made to Table I wherein identical samples were consolidated by the overflush process of this invention in column A and by a known process using a mixture of epoxies and amines in a solvent vehicle from which they are precipitated in the sample cores in column B. The samples were side wall cores from various wells. Compressive strengths indicates degree of consolidation. Also, sample cores in column A had greater permeabilities.

TABLE I

| Sample Cores | Consolidated strength, p.s.i. | |
| --- | --- | --- |
| | Column A | Column B |
| South Pass Blk 24 Field, S.L. 998-58 SWS | >1,000 | 0 |
| South Pass Blk 24 Field, S.L. 998-72 SWS | >1,000 | 0 |
| South Pass Blk 24 Field, S.L. 1008-70, Bailed Sand | 2,630 | 760 |
| South Pass Blk 24 Field, S.L. 1008-70 SWS | >1,000 | 0 |
| South Pass Blk 24 Field, S.L. 1008-70 SWS | >1,000 | 0 |

Since in the present invention the polyepoxide and polyamine is pre-mixed at the surface, before injection into the reservoir, no problem is experienced in achieving the proper chemical proportion between the epoxy and the amine for the best grain to resin bond strength. This is advantageous over processes in which the epoxy and amine are combined in situ, being separately injected. In addition, since the epoxy and amine are already partially polymerized when they are injected, they are less effected by naturally occurring substances in the reservoir.

Probably this invention is more closely akin with processes where mixtures of polyepoxides and curing agents already blended with one another are injected into a reservoir in a liquid vehicle from which they precipitate as the molecular weight of the epoxy/curing agent polymer increases to the point it is no longer completely soluble in the vehicle. At the time of the precipitation of the polymer, the reaction has almost reached the gelling stage and considerable amounts of the liquid vehicle are still incorporated in the polymer precipitated which increase the bulk of the polymer with a resulting decrease in permeability in the reservoir.

However, manifestly different results are achieved in the practice of the instant invention because of the novel overflush technique. First, the overflush effects a partition of a predominately polymer phase from the solvent vehicle prior to the time the epoxy-amino polymer has reached the high molecular weights which causes it to precipitate from its vehicle. This predominately polymer phase is drawn into the small interstitial spaces at the contact points of the grains by capillarity and tends to carry the silt with it because of the high surface tension. The second effect of the overflush is to extract additional solvent from the polymer phase, thereby reducing its volume and leaving the reservoir more permeable. As the overflush extracts the vehicle from the polymer phase, it concentrates it further which also causes the polymerization reaction to proceed faster, resulting in a much shorter curing interval than known processes. For example, four hours versus the usual twelve for known processes.

Of course, other advantages are obtained by the overflushing since its hydrodynamic movement through the pores in the presence of the viscous epoxy-amino polymer tends to move the smaller particles into the polymer clinging in the interstitial spaces between the larger grains. The movement of these fines into such regions will improve permeability and reduce the amount of polymer required for the consolidation.

Also, the polymer phase tends to coat the shaley portions of the reservoir leaving them "locked" in a resinous sheath within the reservoir.

Another advantage is gained from the fact that the polymer phase is slightly soluble in the overflush after partition and before polymerization has proceeded sufficiently to cause it to be precipitated from the vehicle. Thus, after partition of the polymer phase from the solvent vehicle has occurred, the continued injection of the overflush dissolves some of the polymer phase immediately contiguous to the borehole leaving this portion more weakly consolidated than portions of the reservoir further radially from the borehole and this action leads to consolidation in which there is no noticeable change in permeability after consolidation by the method of this invention.

The importance of the above discussion can be seen by referring to the drawing of this invention wherein.

Figure 1:
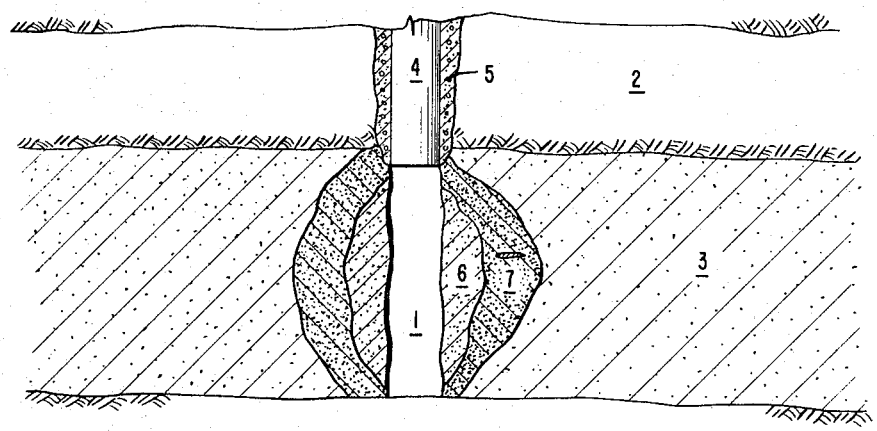
FIGURE 1 is a cross-section of a reservoir penetrated by a borehole in which a consolidation according to this invention has been effected.

Referring to FIGURE 1 showing a borehole 1 penetrating various strata 2 and a reservoir 3, the borehole is cased with a casing 4 cemented in the borehole 1 with sealant 5. In the embodiment shown in FIGURE 1, the casing 4 does not extend into the borehole 1 where the later traverses reservoir 3; however, the borehole could be cased completely through the reservoir, if desired, and perforated to provide the egress for the injection of the epoxy-amino resin mixture.

In general, the epoxy-amino polymer mixed in an appropriate solvent vehicle is injected into zones 6 and 7 of the reservoir 3 and then followed by an overflush in which the epoxy-amino polyer is substantially insoluble but with which the solvent vehicle is miscible. The net result is that zone 6 is somewhat more weakly consolidated than zone 7 because of very slight solubility of the epoxy-amino polymer in the overflush at the time partition is effected. Thus, as one proceeds radially outwardly from the borehole through zones 6 and 7, the strength of the consolidation increases until reaching the outer edge of zone 7. This is desirable since zone 7 has a good deal more drainage surface area than zone 6 and total fluid flow from the reservoir 3 will not be affected nearly as much.

Figure 2:
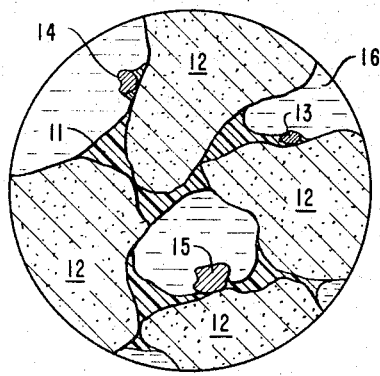
FIGURE 2 shows an enlarged section of the reservoir shortly after the overflush has caused partition of the polymer phase.
Figure 3:
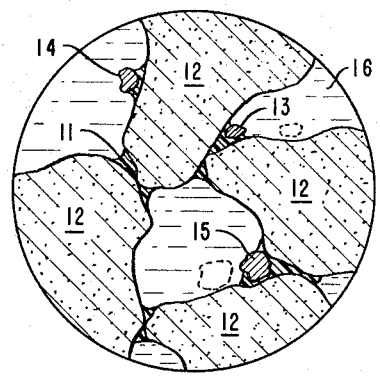
FIGURE 3 shows the same cross-section as FIGURE 2 after the overflushing has been completed.

A better understanding of the mechanism of the invention can be had by referring to FIGURES 2 and 3 showing an enlarged section of the reservoir. Initially, as the overflush progresses into the formation, it effects a partition of the epoxy-amino polymer from its solvent vehicle as a polymer rich phase 11 which tends to wet the large particles 12 as well as the smaller silt particles 13, 14 and 15 and establish uniform contact angles with all the particles.

The expoy-amino polymer rich phase 11 exhibits high capillarity and accumulates in the interstitial spaces at the contact points of the grains as can be seen in FIGURE 2. Since the polymer rich phase 11 still contains a substantial amount of solvent vehicle, continued injection of the overflush will extract more of the solvent vehicle, greatly reducing its volume. As shrinking of the polymer phase occurs, the high surface tensions developing tends to pull the silt particles 13 and 15 into the interstitial space contiguous to the contact points of the large grains 12. The movement of the silt 13 and 15 particles is also assisted by the shear developed by the overflush moving across the grains.

The result of these forces can be seen in FIGURE 3 showing the polymer shrinking back into the interstitial spaces contiguous to the contact points of the large grains 12 having pulled silt particles 13 and 15 into these spaces.

The extraction of the solvent vehicle from the polymer-rich phase results in much greater permeability since the volume of the pore space occupied is considerably less than when the polymer phase contains some of the solvent vehicle. Also, the movement of the silt particles 13 and 15 toward the contact points of the larger grains may be the explanation for occassionally finding more permeability after consolidation according to this invention than existed originally. Some of the silt particles, such as particle 14, may not be moved by the above discussed forces and will be bonded in place by the polymer when it hardens. The overflush fluid 16 fills the pore space not occupied by the polymer in FIGURES 2 and 3 and remains completely mobile throughout the process.

When this novel overflushing technique is not used, the volume occupied by the polymer-rich phase 11 is that shown in FIGURE 2 as opposed to the volume of the polymer in FIGURE 3 after additional solvent vehicle has been extracted from it by the overflush. Where permeability is important, the advantage of reduced polymer volume is self-evident, especially as in this case where there is no loss of bonding strength.

Another advantage of the instant invention is that large amounts of resin can be introduced into the reservoir for consolidating shaley reservoirs where large amounts of resin are required because of the large surface areas of finely divided particles. If such a large amount of resin was attempted to be precipitated from a solution of it in a solvent vehicle by known processes, the resin and the solvent vehicle would gel and completely plug the reservoir. However, using the unique overflushed method of this invention, the polymer (resin) is partitioned from the solvent vehicle and subsequently has most of the solvent vehicle extracted from the polymer-rich phase by the overflushing fluid. Since the polymer is partitioned from the solvent vehicle prior to polymerizing to molecular weights which would be condusive to forming a gel, much more resin can be added to the solvent vehicle initially than would be possible with prior art processes.

As discussed above, this invention contemplated the use of polyepoxides and polyamines mixed with one another which tend to have good wetting properties and also form superior bonds with earthen materials. For convenience, the polyepoxide and polyamine mixtures are often referred to herein as "resin," "polymer" or "epoxy-amine polymer and/or resin." These epoxy-amino resins are quite superior to phenolic resins or epoxides cured with other curing agents, such as acid anhydrides and therefore, they are preferred curing agents in the practice of this invention.

More specifically, the present invention contemplates the use of polyepoxides which are those organic mixtures containing more than one vic-epoxy group

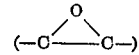

which can be incorporated in organic compounds which are saturated, unsaturated, aliphatic, cycloaliphatic, aromatic or heterocyclic. Often, these polyepoxides are described in terms of their epoxy equivalent value, that is the number of epoxy groups contained in the average molecule. This terminology and the types of polyepoxides useful in this invention are disclosed in U.S. Patent 2,633,458. More generally, the polyepoxides suitable for this invention are well known materials of commerce and many are described in the book "Epoxy Resins" by Lee and Neville. McGraw-Hill New York 1957.

Examples of some polyepoxides useful in the practice of this invention are the glycidyl polyethers of dihydric phenols which can be prepared by the condensation of dihydric phenols with epichlorohydrin in an alkaline medium. Polyhydric phenols which can be condensed with epichlorohydrin to form these polyepoxides are resorcinol, catechol, hydroquinone, methyl resorcinol and polynuclear phenols, such as 2,2-bis(hydroxyphenyl)propane (Bisphenol A), 2,2-bis(4-hydroxyphenyl)butane, 4,4'-dihydroxybenzophenone, bis(4-hydroxyphenyl)ethane, 2,2-bis(4-hydroxyphenyl)pentane, 1,5-dihydroxynaphthalene, and the like. The above-mentioned polyhydricphenols may also contain halogen atoms and their condensation product with epichlorohydrin will contain the same.

The epoxide products obtained by the condensation of epichlorohydrin with these polyhydric phenols are not a single, simple molecule but a complex mixture of glycidyl polyethers having the well known terminal vic-epoxy groups. The epoxy equivalent can vary from 0 to relatively large numbers and/or fractions since the products are a mixture and may contain monomeric monoepoxides.

When the above-referenced glycidyl polyethers have an epoxy equivalent from 1.0 to 2.1, the average molecular weight is somewhere between 250 to 900. However, the glycidyl polyethers which have an epoxy equivalent from 1.0 to 2.1 and a molecular weight between 350 and 400 are usually viscous liquid and therefore, are more desirable for the practice of this invention.

As indicated above, the invention uses polyamines as a curing agent for the polyepoxides described above. Not only are stronger resins obtained with the polyamine but the amines tend to impart preferential sand wetting properties to the partially polymerized epoxy-amino resins mixtures and yield stronger consolidation. Beyond these two important properties mentioned above, the polyamines are preferred because it is necessary that the curing agent be generally insoluble in the overflushing liquid which is a predominantly aliphatic liquid hydrocarbon. In essence, the invention contemplates the use of polyamines which have a solubility of less than about 2–3 parts per 100 in the predominantly aliphatic liquid hydrocarbon used as the overflush (discussed more fully hereinafter).

For example, the more soluble polyamines, such as 1,2-diaminoethane, triethylamine, N,N-dicyclohexanolamine and so forth would tend to be taken up (extracted) by the overflushing hydrocarbon leaving a deficiency of polyamine in relationship to the polyepoxide for the best bond strength. Thus, it is apparent that the parameter restricting the use of polyamines is that it be generally insoluble in the predominantly aliphatic hydrocarbons used for overflushing the solutions of the epoxyamino polymers or resins deployed in the solvent vehicle.

Besides having the above solubility characteristics in the overflushing fluid, it is also desirable that the polyamines have two or more amino functional groups which have at least one active hydrogen. Amines having the requisite characteristics are sulfonyldianiline, 1,3-diaminobenzene, 4,4-methylene dianiline, diethyenetriamine and the like. A person skilled in the art can select other polyamines meeting the parameters set-forth above from those well known in the art.

In carrying out the process of this invention, the polyepoxides and polyamines are usually mixed at a surface location in the desired proportions. It is usually preferred that they be mixed in stoichiometric relationships for the best results. As mentioned above, the polyepoxide will be a viscous liquid and when it is mixed with the polyamine, it will begin to polymerize with the amine becoming even more viscous. Clearly, it would be very difficult to inject such a viscous into the pores of the reservoir and even if possible, it would be undesirable since it could lead to complete plugging of the pore space so injected. Thus, it is desirable to use a solvent vehicle to reduce the viscosity of the mixture to more desirable levels.

At this juncture, it is important to remember that the practice of this invention requires that certain relationships exist between the epoxy-amino polymer, the solvent vehicle and the overflushing fluid. Basically, the epoxy-amino polymer mixture and its components must be insoluble in the overflushing fluid but soluble initially in the solvent vehicle. Also, the overflushing liquid must be miscible with the solvent vehicle so that it can effect the partition of the polymer-rich phase and extract the solvent vehicle therefrom.

In view of the above parameter, solvent vehicles must be carefully selected to meet them. Suitable solvents for a vehicle for the viscous mixture of the epoxides and amines used in this invention are those containing sufficient polar groups to provide an affinity for polyepoxides. Such solvents include methyl acetate, amyl acetate, acetone, methyl ethyl ketone, epichlorohydrin, styrene oxide, phenyl glycidyl ether, alkyl glycidyl ether, benzene, toluene and the like. Other solvents having suitable and similar characteristics are listed in "Epoxy Resins" by Henry Lee and Kris Neville (1957) and like texts. Also, it is possible to use mixtures of these compounds and various ones are known to effect the reaction rate between epoxides with amines. Ketones chemically retard the polymerization rate, in addition to the reduction in rate caused by mere dilution. Therefore, mixtures of solvents may be prepared which will slow down the polymerization rates when consolidations are to be effected in deep wells; on conversely, speed up the reaction in shallow wells, both techniques being known to those skilled in the art.

When employing the process in a reservoir, the polyepoxides and polyamines are mixed with one another and enough solvent vehicle added to allow injection into the particular reservoir in which consolidation is desired. Usually, it is desirable to use from one-half to a pore volume of the resulting solution in the portion of the reservoir to be consolidated, depending somewhat on the conditions existing in the reservoir. Since the epoxy-amino mixture begins to harden (cure) as soon as they are mixed, it is imperative that the solution remain sufficiently fluid to be properly placed in the reservoir. Because temperature is the primary consideration, samples of the mixture may be tested to find the useful interval of any solution prepared. This can be done in test tubes, each having a small sample of the solution which are subjected to different temperatures in the range of those found in the reservoir, and noticing the time for the solution to suddenly become thick. A commonly used solution containing approximately 50% polyepoxides, 10% polyamines and 40% solvent vehicle (all by weight) was tested accordingly and the results appear in Table II.

TABLE II

Effect of temperature on useful mixture interval

| Temperature, ° F.: | Useful period in hours |
|---|---|
| 70 | 130 |
| 100 | 53 |
| 120 | 30 |
| 140 | 17 |
| 160 | 10 |
| 180 | 5½ |
| 200 | 3¼ |
| 210 | 2½ |

In practicing the invention, the injection of the resin solution and the overflushing must be accomplished within the "useful period" to prevent the injected portion of the formation from being sealed off by the curing of the unflushed resin solution in the reservoir. The overflush ensures that the resulting consolidated portion of the reservoir will be permeable.

Just as with many other sand consolidation processes, it is often desirable to prepare the reservoir to be consolidated by removing the residual oil and water from the portion being consolidated. This can be accomplished by injecting into the reservoir a light hydrocarbon, such as diesel oil, to remove the crude oil and an alcohol to remove the water. Techniques such as these and similar ones are well known in the art and in the preparation of the reservoir it is usually desirable that it be wet with a light hydrocarbon when the solution containing the epoxy-amino resin is injected. Also, a spacer fluid consisting of a light hydrocarbon, such as diesel oil, and about 10% by weight of the solvent used as the vehicle is sometimes desirable to prevent removal of the solvent vehicle from the resin solution when it is injected. For the most part, the preflushes can be accomplished with 1 to 3 pore volumes of the portion being consolidated of the fluid used for oil or water removal. Usually 1 pore volume of the spacer fluid is satisfactory.

Also, it may be desirable to incorporate metal organic coupling agents in the preflush fluids to improve the strength of the consolidations with the polyepoxide and amine polymer. Such coupling agents act as "links" between the loose earthen material and the epoxy-amino polymer.

Preferably, the metal organic coupling agent is an organo-functional silane which should be understood as being a polyfunctional organic substance containing at least one silicon atom having one functional group suited for reaction with the particles of the mass to be consolidated and another functional group suitable for reacting with one of the components of the polyepoxide and poly-amine polymer. An example of an organo-functional silane is an "amino-functional silane" or an "epoxy-functional silane."

Especially if the materials to be consolidated contain large amounts of siliceous grains, such as sand, the functional groups suitable for reacting with the grains of the mass to be consolidated are preferably alkoxy groups, such as methoxy or ethoxy groups. Examples of useful amino-functional silanes are:

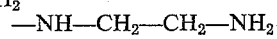

(N-aminoethyl-aminopropyltriethoxy-silane) and

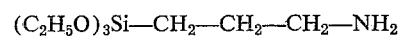

(aminopropyltriethoxy-silane).

Further, the following are examples of epoxy-functional silanes:

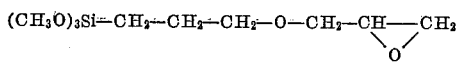

(glycidoxypropyltrimethoxy-silane) and

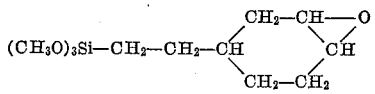

(3,4-epoxycyclohexylethyltrimethoxy-silane).

The presence of even small amounts of such metal organic compounds in the consolidation made according to this invention results in highly superior strengths. It is generally preferred that these metal organic compounds be present in concentrations of 1% or less by volume of the solution which is used as a vehicle to introduce them into the portion to be consolidated. In fact, concentrations less than 1% by volume are extremely useful and a very satisfactory range is from 0.25% to 1% by volume of the preflush fluid used to introduce them into the reservoir.

Subsequent to the injection of the epoxy-amino solution into the reservoir and within the "useful interval" of the epoxy-amino solution (discussed above) the portion of the reservoir having the solution therein must be overflushed with the overflushing liquid. This overflushing liquid must be prepared to meet certain requirements which are (1) that the polyepoxides, polyamines and their reaction product be virtually insoluble in the overflushing liquid and (2) that the solvent vehicle for the epoxy-amino mixture be miscible (very soluble) in the overflushing liquid. Liquids meeting these requirements are the predominately aliphatic hydrocarbon fractions of crudes, such as brightstock oils, diesel oil and the like. For example, a 1:1 mixture of brightstock and No. 2 diesel oil makes a good overflushing liquid for the practice of this invention. Other substances can be employed so long as the two requirements set-forth above are satisfied, and such substances can be identified by persons skilled in the art.

In practice, it is sometimes desirable to adjust the viscosity of the overflushing liquid so that it approximates that of the epoxy-amino solution dispersed in the reservoir to achieve more favorable results. Thus, brightstock and diesel oil may be blended to achieve the proper viscosity before injection into the reservoir and this often improves the strength of the consolidation made according to this invention.

Also, it is desirable to include some of the solvent vehicle in at least the initial portion of the overflushing liquid because this tends to make the partition of the "polymer-rich phase" more gradual and also slow down the initial extraction rate of the solvent vehicle from the polymer-rich phase. In general, the overflushing liquid is tailored to obtain the proper viscosity and about 5% of the volume of the overflushing liquid should be a solvent vehicle to give a gradual extraction rate.

The importance of the overflushing technique is that it partitions the epoxy-amino polymer from the solvent vehicle and subsequently extracts much of the remaining solvent vehicle from the polymer-rich phase formed on partition. Results obtained by this action are portrayed by comparison of the polymer-rich phase 11 in FIGURE 2 with its volume in FIGURE 3 after the overflushing liquid has extracted most of the solvent vehicle from the partitioned polymer-rich phase 11 shown in FIGURE 2. Naturally, when the volume of the resin (polymer) is reduced without any lost strength in the resulting consolidated portion of the reservoir, the permeability is much higher without loss of benefits, a very desirable situation.

To demonstrate the physical extraction effected by overflushing, a simple experiment was performed. A polyepoxide (Shell EPON 828) was mixed with a polyamine and added to a solvent vehicle (ethylacetate) until it represented 60% of the volume of the resulting solution. This solution was mixed with a small volume (approximately $\frac{1}{10}$ of the solution) of a 1:1 mixture of brightstock and No. 2 diesel oil, thoroughly mixed, and the overflush subsequently separated from the mixture. The separated overflush was found to contain about 10% ethylacetate by volume and the remaining polymer solution had increased measurably in viscosity.

In general, the amount of the overflushing liquid should be from 2 to 4 times the volume of the polymer solution dispersed in the reservoir. An optimum amount seems to be about 2½ times the volume of the polymer solution.

After the overflushing step is complete, the well must be shut in until the resin (polymer) completes its cure. The time required is a function of bottom hole temperature: at or above 140° F., the cure is complete in 3 hours or less; at 120° F., the cure time is about 9 hours; and at 100° F., the cure time is about 1 day. It will be noted, of course, these times are substantially less than those required in prior art processes. This occurs because the overflush oil removes the solvent from the resin (polymer) film on the grains to be consolidated, thereby effecting an acceleration of the cure.

The following example is set-forth as a non-limiting illustration of the invention and was used in the field to consolidate "$O_2$" sand at 7480 feet which required consolidation because of the solids intrusion problem.

*Example I*

In a producing well at 7480 feet, an electric log revealed a poorly developed member in the center of a 4-foot perforated producing zone having 4 perforations per foot which indicated the presence of shale or shaley sand, not readily consolidated wth known processes. This producing interval was isolated with appropriate packers and water was injected into the reservoir through the perforations at 2100 p.s.i.g. at the rate of one barrel/minute.

After the water wash, the following materials were sequentially injected:

(1) 756 gallons 50:50 blend Shell Cyclo Sol 73 and Dieseline 50. (Preflush.)
(2) 756 gallons isopropyl alcohol. (Preflush.)
(3) 504 gallons Dieseline 50. (Preflush.)
(4) 252 gallons mixture of 225 gallons Dieseline 50, 26 gallons ethylacetate, 1 gallon Dow Corning Z6040 (silane). (Spacer.)
(5) Resin solution (all ingredients premixed before pumping into well) composed of:
    (a) 121 gallons Shell EPON 828.
    (b) 24 gallons Shell curing agent Z.
    (c) 108 gallons ethylacetate. (This solution separated from preflush and overflush by wiper plugs.)
(6) Overflushing liquid in two slugs (a and b):
    (a) 84 gallons Dieseline 50, 168 gallons Silver Shell 30 (motor oil), and 13 gallons ethylacetate.
    (b) 252 gallons Dieseline 50 and 252 gallons Silver Shell 30 (motor oil).

All materials were pumped at a constant rate of 0.5 bbl./min. Pumping pressures were as follows:

|   | P.s.i. |
|---|---|
| Preflushes | 2400–2800 |
| Resin solution | 2300–2500 |
| Overflushes | 2000–2400 |

The well was shut-in four hours and diesel injected at a rate of 0.5 bbl./min. with a pressure of 2600 p.s.i. The pressure was raised to 3300 p.s.i. (about 0.9 bbl./min.) momentarily and it dropped suddenly to 3100 p.s.i. The rate was reduced to 0.5 bbl./min. and the required pump pressure was then 2300 p.s.i. indicating a slight fracture had occurred.

The well was cleaned out and placed on production. The fluid was swabbed to 2500 feet and the well began to flow. An estimated 1 barrel of sand was recovered during the swabbing operations. After recovering the injected liquids, the well tested at a rate of 187 bbl./day of oil, 0.1 percent water, no sand, GOR 732 cu. ft./bbl. with a 940 p.s.i. tubing pressure through a $10/64$-inch choke.

The well was last reported to be producing 256 bbl./day of oil with no sand.

Legend:
Shell Cyclo Sol 73—diesel fuel oil with approximately 60% aromatic content
Shell Dieseline 50—diesel fuel oil
Shell EPON$^R$ 828—Bisphenol A and epichlorohydrin alkaline condensation product (average molecular weight 380)
Shell Curing Agent Z—adduct of meta-phenylene and methylene dianiline with phenyl glycidyl ether
Dow Corning Z 6040—glycidoxypyropyltrimethoxy silane

I claim as my invention:

1. An improved process for consolidating loose earthen materials contiguous to a penetrating borehole in oil-bearing reservoirs comprising:
   (a) injecting into a portion of such a reservoir to be consolidated through a penetrating borehole a polymerizing mixture of polyepoxides and polyamines dispersed in a solvent vehicle;
   (b) subsequently injecting at least an equal volume of an overflushing liquid in which said solvent vehicle is miscible and in which said polymerizing mixture of polyepoxides and polyamines is substantially immiscible whereby said polymerizing mixture is partitioned and said solvent vehicle is extracted from the resulting partitioned polymerizing mixture; and
   (c) retaining said overflushing liquid within said portion of said formation being consolidated until said polymerizing mixture has cured.

2. A process according to claim 1 wherein the portion of the reservoir consolidated is pre-treated by flushing fluids prior to consolidation to remove naturally occurring oil and water in said portion of said reservoir.

3. A process according to claim 2 wherein the flushing fluids contain organo-functional silanes to enhance the strength of the subsequent consolidation.

4. A process according to claim 3 wherein the organo-functional silanes are selected from the group consisting of amino-functional silanes and epoxy-functional silanes.

5. A process according to claim 1 wherein the loose earthen materials of the reservoir consolidated contain argillaceous materials and have over 10% by volume of silt.

6. A process according to claim 1 wherein the polymerizing mixture of polyepoxides and polyamines is stoichiometric.

7. A process according to claim 1 wherein the polymerizing mixture of polyepoxides and polyamines dispersed in its solvent vehicle has a solution viscosity of 1 to 80 centipoises.

8. A process according to claim 1 wherein the solvent vehicle is a low molecular weight organic ester and the overflushing iquid is a predominantly aliphatic liquid hydrocarbon in which the polymerizing mixture of polyepoxides and polyamines is substantially insoluble.

9. A process according to claim 8 wherein the overflushing liquid has a viscosity at least equal to that of the polymerizing mixture of polyepoxides and polyamines dispersed in its solvent vehicle at the time the overflush is carried out.

10. An improved process for consolidating loose earthen materials containing argillaceous materials contiguous to boreholes penetrating oil-bearing reservoirs having at least 10% silt by volume comprising:
    (a) injecting into a portion of such a reservoir to be consolidated from 0.5 to 1 pore volume of said portion of a solution of a polymerizing mixture of polyepoxides and polyamines dispersed in a solvent vehicle;
    (b) subsequently injecting into said portion from 1 to 3 times its pore volume of an overflushing liquid in which said solvent vehicle is miscible and in which said polymerizing mixture of polyepoxides and polyamines is immiscible, said injection being accomplished at a point in time prior to the point at which the polymerization of said mixture has proceeded far enough to cause said mixture to separate from said solvent vehicle; and
    (c) retaining said overflushing liquid in said pore space of said portion until said polymerizing mixture deposited therein by partition and extraction of said solvent vehicle by said overflushing liquid has cured to a bonding plastic consolidating said portion of said reservoir.

11. A process according to claim 10 wherein the polymerizing mixture of polyepoxides and polyamines dispersed in the solvent vehicle is more than 50% by volume of the resulting solution.

12. A process according to claim 10 wherein the portion of the reservoir being consolidated is pre-treated with flushing fluids to remove naturally occurring water and oil from said portion prior to the injection of the solution of the polymerizing mixture of polyepoxides and polyamines in the solvent vehicle.

13. A process according to claim 12 wherein at least one of the flushing fluids contains an organo-functional silane.

14. A process according to claim 12 wherein a spacer liquid containing less than 50% by volume of the solvent vehicle is used as a spacer between the flushing fluids and the solution of the polymerizing mixture of polyepoxides and polyamines dispersed in the solvent vehicle to prevent loss of said solvent vehicle from said solution prior to the injection of the overflushing liquid.

15. A process according to claim 10 wherein the solution of the polymerizing mixture of polyepoxides and polyamines dispersed in the solvent vehicle contains an organo-functional silane.

16. A process according to claim 10 in which at least the initial portion of the overflushing liquid contains some of the solvent vehicle to make the extraction of the solvent vehicle more gradual.

17. An improved process for consolidating loose earthen materials contiguous to a penetrating borehole into a subterranean reservoir comprising:
    (a) injecting into a portion of such a reservoir to be consolidated through a penetrating borehole a polymerizing mixture of polyepoxides and polyamines dispersed in a solvent vehicle;
    (b) subsequently injecting at least an equal volume of an overflushing liquid in which said solvent vehicle is miscible and in which said polymerizing mixture of polyepoxides and polyamines is substantially immiscible whereby said polymerizing mixture is partitioned and said solvent vehicle is extracted from the resulting partitioned polymerizing mixture; and
    (c) retaining said overflushing liquid within said portion of said formation being consolidated until said polymerizing mixture has cured.

18. An improved process for consolidating loose earthen materials containing argillaceous materials contiguous to boreholes penetrating subterranean reservoirs having at least 10% silt by volume comprising:
    (a) injecting into a portion of such a reservoir to be consolidated from 0.5 to 1 pore volume of said portion of a solution of a polymerizing mixture of polyepoxides and polyamines dispersed in a solvent vehicle;
(b) subsequently injecting into said portion from 1 to 3 times its pore volume of an overflushing liquid in which said solvent vehicle is miscible and in which said polymerizing mixture of polyepoxides and polyamines is immiscible, said injection being accomplished at a point in time prior to the point at which the polymerization of said mixture has proceeded far enough to cause said mixture to separate from said solvent vehicle; and
(c) retaining said overflushing liquid in said pore space of said portion until said polymerizing mixture deposited therein by partition and extraction of said solvent vehicle by said overflushing liquid has cured to a bonding plastic consolidating said portion of said reservoir.

References Cited

UNITED STATES PATENTS

| | | | |
|---|---|---|---|
| 3,123,138 | 3/1964 | Robichaux | 166—33 |
| 3,176,767 | 4/1965 | Brandt et al. | 166—33 |
| 3,176,768 | 4/1965 | Brandt et al. | 166—33 |
| 3,176,769 | 4/1965 | Treadway et al. | 166—33 |
| 3,291,213 | 12/1966 | Bezemer et al. | 166—33 |
| 3,294,165 | 12/1966 | Meijs et al. | 166—33 |
| 3,294,168 | 12/1966 | Bezemer et al. | 166—33 |
| 3,297,089 | 1/1967 | Spain | 166—33 |

FOREIGN PATENTS 928,127  6/1963  Great Britain.

CHARLES E. O'CONNELL, *Primary Examiner.*

STEPHEN J. NOVOSAD, *Examiner.*